United States Patent
Amonou

(10) Patent No.: US 6,580,757 B1
(45) Date of Patent: Jun. 17, 2003

(54) DIGITAL SIGNAL CODING AND DECODING

(75) Inventor: Isabelle Amonou, Thorigne-Fouillard (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/237,247

(22) Filed: Jan. 26, 1999

(30) Foreign Application Priority Data

Feb. 20, 1998 (FR) ............................................. 98 02067

(51) Int. Cl.$^7$ ................................................. H04N 7/12
(52) U.S. Cl. ............................. 375/240.11; 375/240.19
(58) Field of Search ........................ 375/240.1, 240.11, 375/240.19; 348/397.1, 398.1, 437.1, 438.1; 382/240, 249, 241

(56) References Cited

U.S. PATENT DOCUMENTS

| | | | | |
|---|---|---|---|---|
| 5,235,420 A | * | 8/1993 | Gharavi | 348/398 |
| 5,253,058 A | * | 10/1993 | Gharavi | 348/415 |
| 5,481,308 A | | 1/1996 | Hartung et al. | 348/398 |
| 5,633,684 A | * | 5/1997 | Teranishi et al. | 348/398 |
| 5,973,755 A | * | 10/1999 | Gabriel | 348/699 |
| 6,185,254 B1 | * | 2/2001 | Ogata | 375/240.19 |
| 6,215,422 B1 | * | 4/2001 | Henry et al. | 341/51 |
| 6,219,383 B1 | * | 4/2001 | Park | 375/240.16 |

FOREIGN PATENT DOCUMENTS

WO    WO 97/15146    4/1997

OTHER PUBLICATIONS

R. Rinaldo et al., "An Image Coding Scheme Using Block Prediction of The Pyramid Subband Decomposition," Proceedings of the International Conference on Image Processing (Austin, Nov. 13–16, 1994), vol. 2, No. CONF1, Nov. 13, 1994, pp. 878–882.

Kamel Belloulata et al., "Fractal Coding of Subbands Using An Oriented Partition," Signal Processing VIII, Theories and Applications, Proceedings of EUSIPCO–96, Eighth European Signal Processing Conference, Trieste, Italy, Sep. 10–13, 1996, pp. 1167–1170.

Gregory Caso et al., "Multiresolution Analysis of Fractal Image Compression," Fractal Image Encoding and Analysis, Trondheim, Norway, Jul. 8–17, 1998, vol. 5, Suppl Issue, pp. 215–229.

Bernd Hürtgen et al., "Fractal approach to low rate video coding," Proceeding of the SPIE, vol. 2094, No. 1, Jan. 1, 1993, pp. 120–131.

* cited by examiner

*Primary Examiner*—Vu Le
(74) *Attorney, Agent, or Firm*—Fitzpatrick, Cella, Harper & Scinto

(57) ABSTRACT

A digital signal coding method includes a step of analysing the digital signal into a plurality of frequency sub-bands distributed according to at least two different resolutions, at least one first sub-band having a lower resolution and at least one second sub-band having a higher resolution. The method includes, for each second sub-band, the steps of dividing the second sub-bands into target blocks, selecting, for each of the target blocks, a predetermined number of source blocks in the at least one first sub-band, and determining, for each of the target blocks, a multilinear approximation between the source blocks selected at the preceding step and the target block.

36 Claims, 8 Drawing Sheets

DIGITAL SIGNAL CODING AND DECODING

The present invention concerns in general terms digital signal coding, and for this purpose proposes a device and a method for coding a digital signal by breaking down the signal into frequency sub-bands and coding the coefficients resulting from the breakdown into sub-bands. It also concerns a decoding method and device corresponding to the coding method and device.

The purpose of coding is to compress the signal, which enables the digital signal to be transmitted, or respectively stored, thus reducing the transmission time or transmission rate, or respectively reducing the memory space used.

The invention is situated in the field of compression of digital signals with loss.

Breaking down a signal into frequency sub-bands before compressing it is known. The breakdown consists of creating, from the signal, a set of sub-bands which each contain a limited range of frequencies. The sub-bands can be of different resolutions, the resolution of a sub-band being the number of samples per unit length used for representing the sub-band. In the case of a digital image signal, a frequency sub-band of this signal can itself be considered to be an image, that is to say a bidimensional table of numerical values.

It should be noted that breaking down a signal into frequency sub-bands does not create any compression in itself, but makes it possible to decorrelate the signal so as to eliminate redundancy therefrom prior to the compression proper. The sub-bands are thus coded more effectively than the original signal.

A known method of coding a digital signal, in this case a digital image, uses the similarity between blocks of different sub-bands of a multiresolution breakdown of the image. This method is based on an inter-scale prediction which consists overall of seeking a source block in a source sub-band in order to predict a target block of the sub-band which it is sought to code. For this purpose, it is necessary to construct a dictionary of possible source blocks, generally containing all the blocks which exist in a window of the source sub-band and source blocks formed by applying a transformation (multiplication by a constant, geometric transformations, for example) to the preceding source blocks.

The target block is next compared with all the source blocks in the dictionary, and then the closest source block is selected as a coded form of the target block.

This method makes it possible to obtain good visual quality of the restored image and limited distortion. However, the time required for processing each target block, as disclosed above, and consequently the time required for coding an image, is lengthy.

The present invention aims to remedy the drawbacks of the prior art by providing a device and method for compressing a digital signal which offers rapid coding, with a quality of restoration of the image which is at least equal to that obtained with known methods.

To this end, the invention proposes a digital signal coding method including a step of analysing the digital signal into a plurality of frequency sub-bands distributed in at least two different resolutions, at least one first sub-band having a lower resolution and at least one second sub-band having a higher resolution, characterised in that it includes, for each second sub-band the steps of:
dividing the second sub-band into target blocks,
selecting, for each of the target blocks, a predetermined number of source blocks in a first sub-band,
determining, for each of the target blocks, a transformation between the source blocks selected at the preceding step and the target block.

Correlatively, the invention proposes a digital signal coding device including means of analysing the digital signal into a plurality of frequency sub-bands distributed in at least two different resolutions, at least one first sub-band having a lower resolution and at least one second sub-band having a higher resolution, characterised in that it includes, for each second sub-band:
means of dividing the second sub-band into target blocks,
means of selecting, for each of the target blocks, a predetermined number of source blocks in a first sub-band,
means of determining, for each of the target blocks, a transformation between the source blocks selected at the preceding step and the target block.

The method and device according to the invention make it possible to code a digital signal rapidly, whilst offering a high ratio of compression to distortion.

Advantageously, the invention proposes a digital signal coding method including a step of analysing the digital signal into a plurality of frequency sub-bands distributed according to at least two different resolutions, at least one first sub-band having a lower resolution and at least one second sub-band having a higher resolution, characterised in that it includes, for each second sub-band, the steps of:
dividing the second sub-band into target blocks,
selecting target blocks which are to be coded by setting to a predetermined value, according to a selection criterion,
coding the target blocks selected at the preceding step, by setting to the predetermined value,
selecting, for each of the target blocks which have not been selected, a predetermined number of source blocks in a first sub-band,
determining, for each of the target blocks which have not been selected, a transformation between the source blocks selected at the preceding step and the target block.

Correlatively, the invention proposes a digital signal coding method including a step of analysing the digital signal into a plurality of frequency sub-bands distributed according to at least two different resolutions, at least one first sub-band having a lower resolution and at least one second sub-band having a higher resolution, characterised in that it includes, for each second sub-band:
means of dividing the second sub-band into target blocks,
means of selecting target blocks which are to be coded by setting to a predetermined value, according to a selection criterion,
means of coding the target blocks selected at the preceding step, by setting to the predetermined value,
means of selecting, for each of the target blocks which have not been selected, a predetermined number of source blocks in a first sub-band,
means of determining, for each of the target blocks which have not been selected, a transformation between the source blocks selected at the preceding step and the target block.

The coding of selected blocks by setting to a predetermined value makes it possible to improve the ratio of compression to distortion.

According to a preferred characteristic, the selection step includes, for each of the target blocks, the coding of the target block by setting to the predetermined value and by determining a transformation between source blocks and the target block, the comparison of the two coding modes according to the selection criterion and the selection of coding by setting to the predetermined value if the block coded by setting to the predetermined value satisfies the selection criterion.

Selection is thus effected simply and rapidly.

According to another preferred characteristic, the selection criterion minimises a weighted sum of the transmission rate and coding error caused by the coding of the target block under consideration. The criterion is reliable and simple to implement.

According to a preferred characteristic, an indicator is associated with each target block in order to indicate whether or not the block under consideration is coded by setting to the predetermined value.

According to a preferred characteristic, for any target block under consideration, the location of the source blocks selected in the first sub-band is determined according to the location of the target block in the second sub-band. The invention therefore entails no seeking of a source block, which saves time during coding.

According to a preferred characteristic, for any target block under consideration, the source blocks selected in the first sub-band overlap in pairs. This makes it possible to improve the quality of the coding.

According to preferred characteristics:
the sub-bands formed at the analysis step contain details in different orientations with respect to the original digital signal,
for any target block under consideration, the relative position of
the source blocks selected in the first sub-band depends on the orientation of the sub-band under consideration, and
for any second sub-band under consideration, the first sub-band is the sub-band of the same orientation and with the resolution immediately below with respect to the second sub-band.

These characteristics improve the quality of the coding by supplying more "pertinent", source blocks for coding the target block.

According to other preferred characteristics, for any target block under consideration, the transformation is a multilinear approximation and minimises a distance between the target block and its approximation calculated by applying the transformation to the selected source blocks. The calculation of the distance includes the calculation of a difference between the values of the data of the target block and the values of its approximation calculated by applying the transformation to the source blocks.

The coding thus entails only simple and rapid calculations.

According to a preferred characteristic, the distance is the root mean square error calculated between the values of the target block and the values of the block resulting from the application of the approximation to the source blocks.

According to another preferred characteristic, for any one of the target blocks under consideration, the source blocks have a size which is a multiple by a factor $F^2$ of that of the target block and are sub-sampled by the factor F, where F is an integer greater than or equal to 2, or the source blocks have the same size as the target block.

The invention also concerns a method of decoding a coded digital signal, the said signal including coded representations of blocks formed in at least one second sub-band of a plurality of frequency sub-bands of the original signal, the said sub-bands being distributed according to at least two different resolutions, at least one first sub-band having a lower resolution and the said at least one second sub-band having a higher resolution, each coded representation including at least one transformation between the block and selected source blocks in the said at least one first sub-band, characterised in that it includes, for each block of each second sub-band, the step of applying the transformation to the source blocks in order to decode the block.

The invention also concerns a method of decoding a coded digital signal, the said signal including coded representations of blocks formed in at least one second sub-band of a plurality of frequency sub-bands of the original signal, the said sub-bands being distributed according to at least two different resolutions, at least one first sub-band having a lower resolution and the said at least one second sub-band having a higher resolution, each coded representation including at least one indicator for indicating whether the block has been coded by setting to a predetermined value or by a transformation between the block and selected source blocks in the said at least one first sub-band, characterised in that it includes, for each block of each second sub-band, the steps of:
reading the indicator,
forming a block, all the coefficients of which are at the predetermined value if the block was coded by setting to the predetermined value,
applying the transformation to the source blocks in order to decode the block, if the block was coded by a transformation between the block and source blocks.

Correlatively, the invention proposes a device for decoding a coded digital signal, including means of implementing these characteristics.

The decoding method and device make it possible to reconstruct the signal, for example in a receiving apparatus corresponding to a sending apparatus in which the signal has been coded according to the invention.

The characteristics and advantages of the present invention will emerge more clearly from a reading of a preferred embodiment illustrated by the accompanying drawings, in which.

Figure 1:
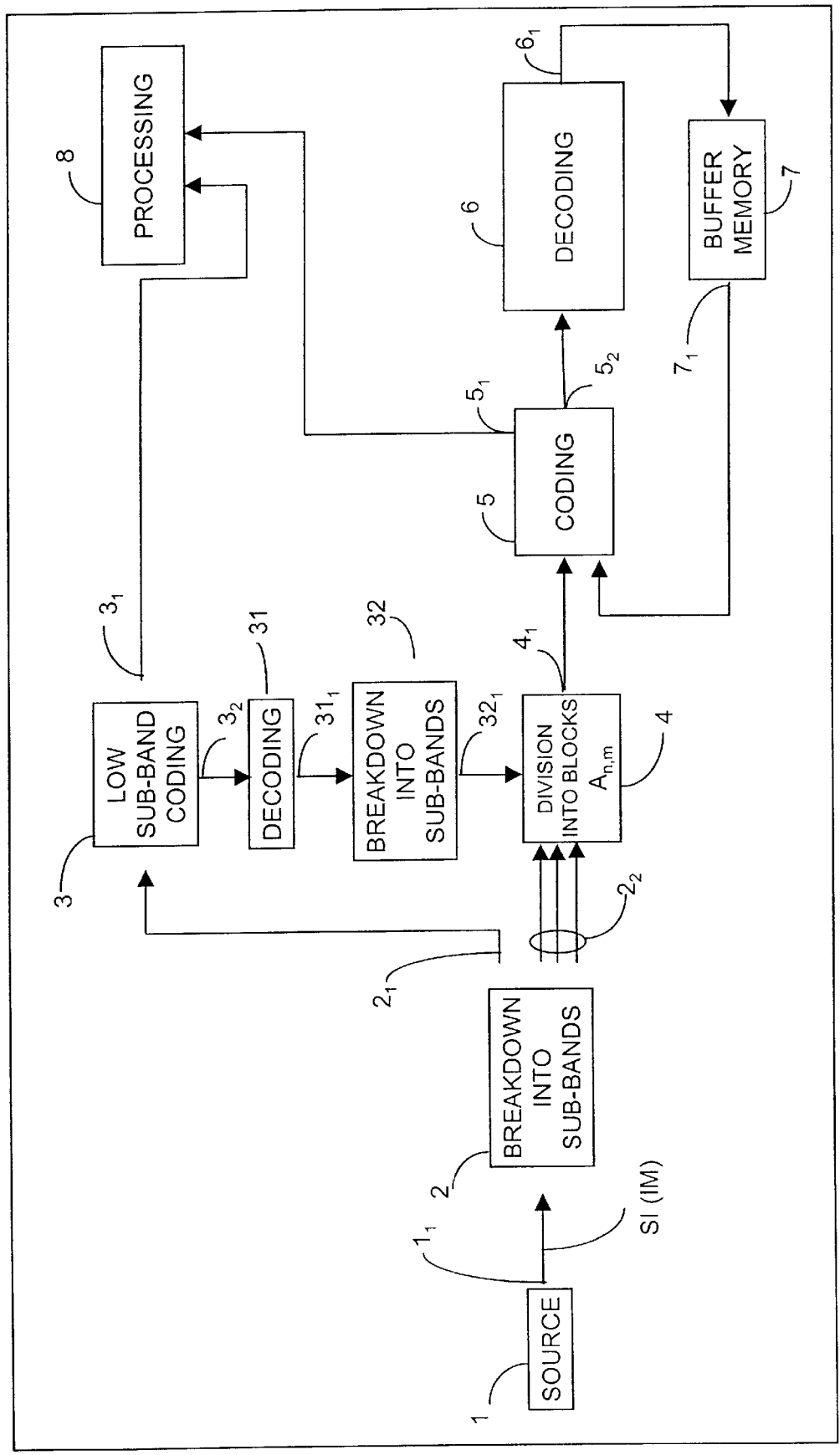
FIG. 1 is a block diagram of an embodiment of a digital signal coding device according to the invention.

According to the embodiment chosen and depicted in FIG. 1, a coding device according to the invention is designed to code a digital signal for the purpose of compressing it. The coding device is integrated into an apparatus 100, which is for example a digital photographic apparatus, or a digital camcorder, or a database management system, or again a computer.

The digital signal to be compressed SI is in this particular embodiment a series of digital samples representing an image.

The device has a signal source 1, here an image signal source. In general terms, the signal source either contains the digital signal, and is for example a memory, a hard disk or a CD-ROM, or converts an analogue signal into a digital signal, and is for example an analogue camcorder associated with an analogue to digital converter. An output $1_1$ of the signal source is connected to a first analysis circuit or circuit for breaking down into sub-bands 2. The circuit 2 has a first output $2_1$ connected to a coding circuit 3.

The coding circuit 3 has a first output $3_1$ connected to a processing circuit, and a second output $3_2$ connected to a decoding circuit 31. The latter has an output $3_1$ connected to a second circuit for breaking down into sub-bands 32, an output $32_1$ of which is connected to a circuit for dividing into blocks 4.

Second outputs $2_2$ of the breakdown circuit 2 are connected to the circuit for dividing into blocks 4. The circuit 4 has an output $4_1$ connected to a coding circuit 5.

A first output $5_1$ of the circuit 5 is connected to a processing circuit 8, which is for example a transmission circuit, or a memory. A second output $5_2$ for the circuit 5 is connected to a decoding circuit 6, an output $6_1$ of which is connected to a buffer memory 7.

An output $7_1$ of the buffer memory 7 is connected to the coding circuit 5.

The image source 1 is a device for generating a series of digital samples representing an image IM. The source 1 has an image memory and supplies a digital image signal SI to the input of the breakdown circuit 2. The image signal SI is a series of digital words, for example bytes. Each byte value represents a pixel of the image IM, here with 256 grey levels, or black and white image.

The circuit for breaking down into sub-bands 2, or analysis circuit, is, in this embodiment, a conventional set of filters, respectively associated with decimators by two, which filter the image signal in two directions, into sub-bands of high and low spatial frequencies. According to FIG. 2, the circuit 2 has three successive analysis units for breaking down the image IM into sub-bands according to three resolution levels.

In general terms, the resolution of a signal is the number of samples per unit length used to represent this signal. In the case of an image signal, the resolution of a sub-band is related to the number of samples per unit length for representing this sub-band horizontally and vertically. The resolution of a sub-band depends on the number of decimations performed, the decimation factor and the resolution of the initial image.

The first analysis unit receives the digital image signal and applies it to two digital filters, respectively low pass and high pass 21 and 22, which filter the image signal in a first direction, for example horizontal in the case of an image signal. After passing through decimators by two 210 and 220, the resulting filtered signals are respectively applied to two low-pass filters 23 and 25, and high pass filters 24 and 26, which filter them in a second direction, for example vertical in the case of an image signal. Each resulting filtered signal passes through a respective decimator by two 230, 240, 250 and 260. The first unit delivers at its output four sub-bands $LL_1$, $LH_1$, $HL_1$ and $HH_1$ of the highest resolution $RES_1$ in the breakdown.

The sub-band $LL_1$ includes the components, or coefficients, of low frequency in both directions, of the image signal. The sub-band $LH_1$ includes the components of low frequency in a first direction and of high frequency in a second direction, of the image signal. The sub-band $HL_1$ includes the components of high frequency in the first direction and the components of low frequency in the second direction. Finally, the sub-band $HH_1$ includes the components of high frequency in both directions.

Each sub-band is a set of real coefficients constructed from the original image, which contains information, or image details, corresponding to a respectively vertical, horizontal and diagonal orientation of the contours of the image, in a given frequency band; for example, the sub-band containing the vertical high frequencies corresponds to the horizontal details of the image. Each sub-band can be assimilated to an image.

The sub-band $LL_1$ is analysed by an analysis unit similar to the previous one in order to supply four sub-bands $LL_2$, $LH_2$, $HL_2$ and $HH_2$ with a resolution level $RES_2$ which is intermediate in the breakdown. The sub-band $LL_2$ includes the components of low frequency in both analysis directions, and is in its turn analysed by the third analysis unit similar to the previous two. The third analysis unit supplies sub-bands $LL_3$, $LH_3$, $HL_3$ and $HH_3$, with the lowest resolution $RES_3$ in the breakdown, resulting from the division of the sub-band $LL_2$ into sub-bands.

Each of the sub-bands of resolution $RES_2$ and $RES_3$ also corresponds to an orientation in the image.

The breakdown performed by the circuit 2 is such that a sub-band of given resolution is divided into four sub-bands of lower resolution and therefore has four times more coefficients than each of the sub-bands of lower resolution.

Figure 4:
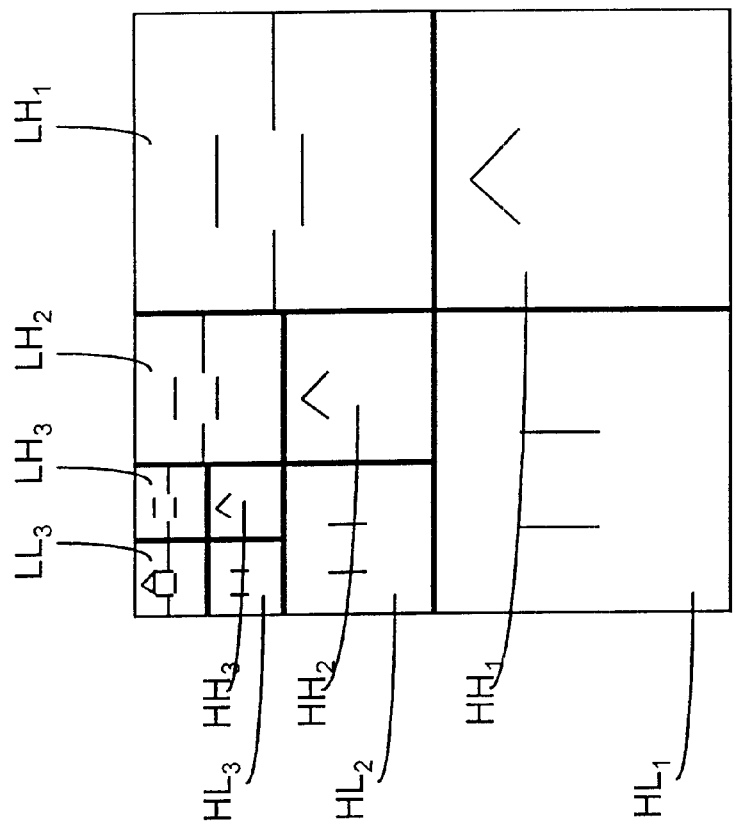
FIG. 4 is an image broken down into sub-bands by the circuit of FIG. 2.
Figure 3:
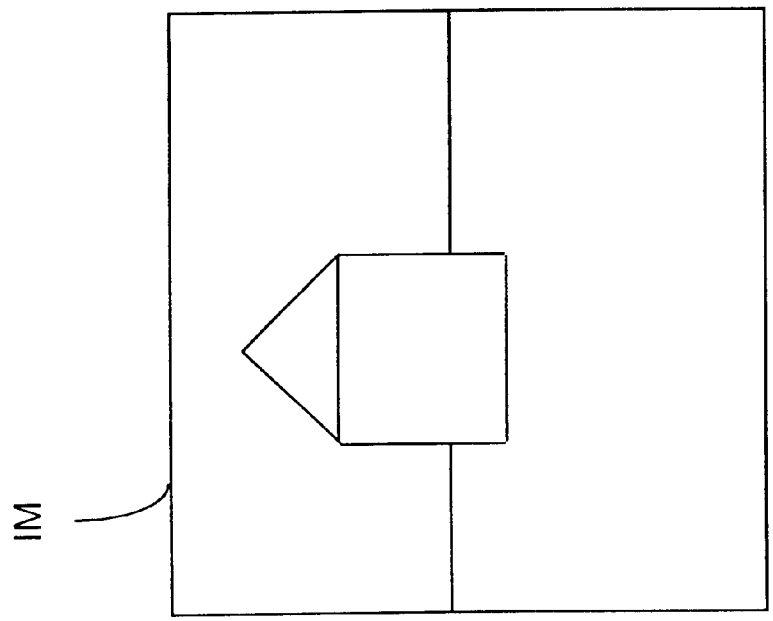
FIG. 3 is a digital image to be coded by the coding device according to the invention.

A digital image IM output from the image source 1 is depicted schematically in FIG. 3, whilst FIG. 4 depicts the image IMD resulting from the breakdown of the image IM, into ten sub-bands according to three resolution levels, by the circuit 2. The image IMD contains as much information as the original image IM, but the information is divided by frequency according to three resolution levels.

The level of lowest resolution $RES_3$ includes the sub-bands $LL_3$, $HL_3$, $LH_3$ and $HH_3$, that is to say the sub-bands of low frequency according to the two analysis directions. The second resolution level $RES_2$ includes the sub-bands $HL_2$, $LH_2$ and $HH_2$ and the level of highest resolution $RES_1$ includes the sub-bands of highest frequency $HL_1$, $LH_1$ and $HH_1$.

The sub-band $LL_3$ of lowest frequency, also referred to as the low sub-band, is a reduction of the original image. The other sub-bands are detail sub-bands.

Naturally, the number of resolution levels, and consequently of sub-bands, can be chosen differently, for example 13 sub-bands and four resolution levels, for a bidimensional signal such as an image. The number of sub-bands per resolution level can also be different. The filters can be non-separable, that is to say bidimensional filters. The analysis and synthesis circuits are adapted to the dimension of the processed signal.

According to another embodiment, the breakdown of the image is of a redundant type, and is for example effected by means of an "a trous" algorithm. The sub-bands all have the same size: the spatial resolution is identical for all the sub-bands. However, the frequency resolution is different from one level to another, which makes it possible to obtain finer and finer details along with the breakdowns.

The sub-band $LL_3$ of lowest resolution $RES_3$ is applied to the coding circuit 3, which codes it into a coded, or compressed, sub-band $LLc_3$.

The coding circuit 3 performs a DPCM (Differential Pulse Code Modulation) coding, which is a coding by linear prediction, with loss. Each pixel of the sub-band to be coded $LL_3$ is predicted according to its neighbours, and this prediction is subtracted from the value of the pixel under consideration, for the purpose of forming a differential "image" which has less correlation between pixels than the original image. The differential image is then quantized and coded by a Huffman coding in order to form the coded sub-band $LLC_3$.

According to other embodiments, the coding circuit 3 performs a coding by discrete cosine transformation (DCT), or by vector quantization, or again by fractal coding, or by any other fixed-image coding method. In all cases, the coding of the low sub-band must exhibit a good coding quality, since the low sub-band must be coded with the greatest possible precision in order to obtain good restoration of the image on decoding.

The coding circuit 3 supplies the coded sub-band $LLc_3$ to the processing circuit 8 and to the decoding circuit 31, which decodes it and forms a decoded sub-band $LLd_3$.

Figure 2:
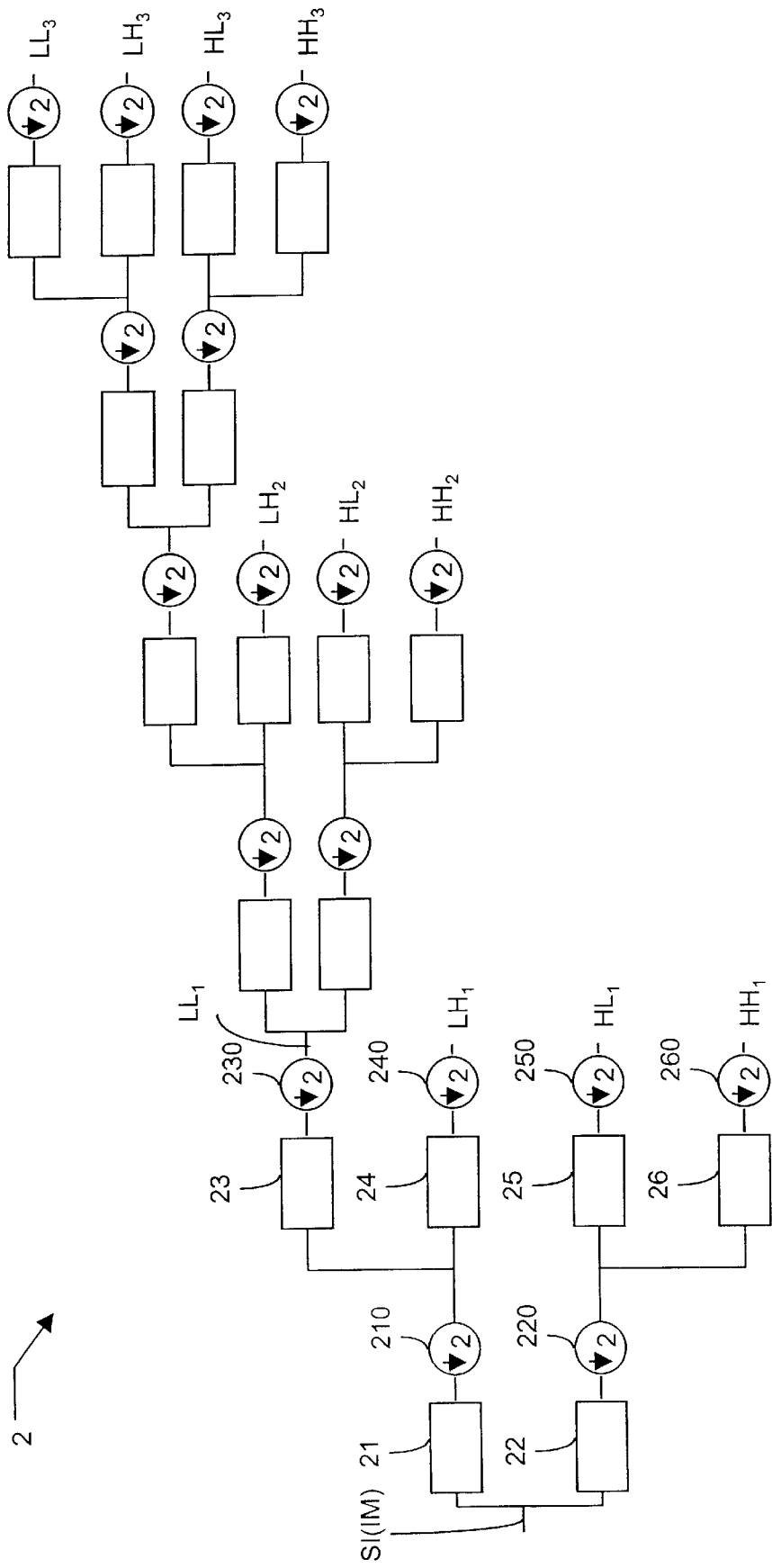
FIG. 2 is a circuit for breaking down into frequency sub-bands, included in the device of FIG. 1.

The decoding circuit 31 performs operations which are the reverse of those of the coding circuit 3 and supplies the decoded sub-band $LLd_3$ to the circuit for breaking down into sub-bands 32, which is similar to the first analysis unit of the circuit 2 previously described (FIG. 2). The circuit 32 forms four sub-bands $LL_4$, $LH_4$, $HL_4$ and $HH_4$ of resolution $RES_4$, which are supplied to the circuit for dividing into blocks 4. As disclosed below, the sub-bands $LH_4$, $HL_4$, and $HH_4$ are used for coding the sub-bands $LH_3$, $HL_3$ and $HH_3$ respectively.

The sub-bands $LH_3$, $HL_3$ and $HH_3$, as well as the sub-bands of higher resolution $HL_2$, $LH_2$, $HH_2$, $HL_1$, $LH_1$ and $HH_1$ are supplied to the division circuit 4, in a sub-band order which is a priori random, but predetermined.

Figure 5:
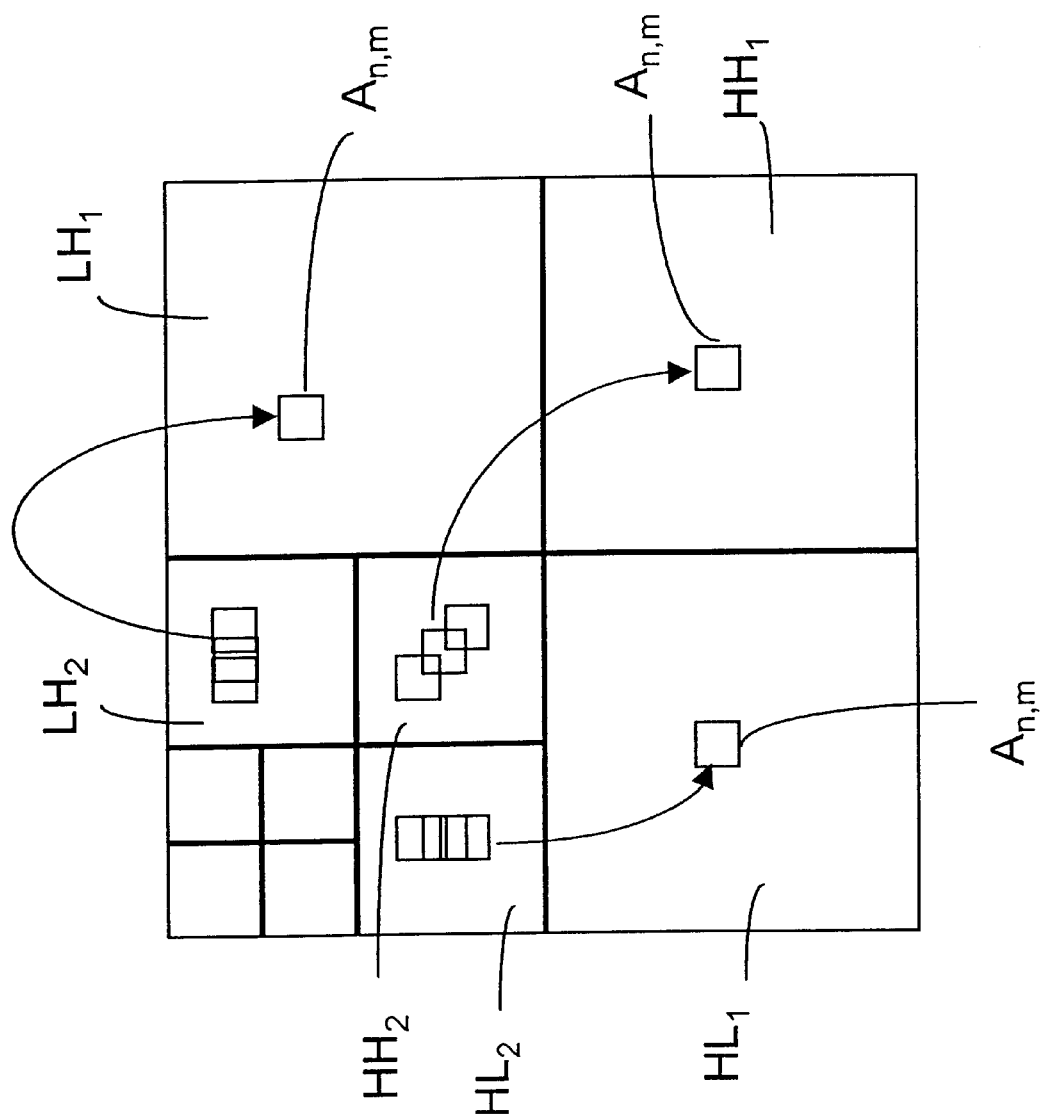
FIG. 5 is an image broken down into sub-bands and then divided into blocks.

As depicted in FIG. 5, the division circuit 4 divides each sub-band into blocks. According to the embodiment chosen, all the sub-bands supplied to the circuit 4 are divided into blocks $A_{n,m}$ of the same size, where the index n is an integer, here between 1 and 9, which represents the order of the sub-band under consideration, and the index m, between 1 and M, is an integer which represents the order of the block in the sub-band under consideration. The blocks are here square in shape, but can in a variant be rectangular. Other types of grouping of coefficients are possible. In general terms, a block is a set of coefficients extracted from the sub-band in order to form a vector.

The order of processing of the blocks is a priori random, but predetermined. For practical reasons, the blocks are ordered in the same way in all the sub-bands, for example from left to right and from top to bottom. The number of blocks is here different from one sub-band to another.

The consequence of the mode of dividing into blocks, the number of coefficients of the blocks is unchanged when going from resolution $RES_1$ to resolution $RES_2$, from resolution $RES_2$ to resolution $RES_3$, and from resolution $RES_3$ to resolution $RES_4$.

To any given block, referred to as the target block, $A_{n,m}$ of the sub-bands of resolution $RES_1$, $RES_2$ and $RES_3$, there corresponds a predetermined number of blocks, referred to as source blocks, in the sub-band of the same resolution and of immediately lower resolution $RES_2$, $RES_3$, $RES_4$, respectively. The source blocks $D_{n,m,1}$ to $D_{n,m,K}$ are for example three in number (K=3) and have the same size as the target block. The position of the source blocks is determined according to that of the target block in its respective sub-band.

The source blocks overlap in pairs, whilst being distributed on each side of a location similar to that of the target block in its sub-band, except for the resolution factor. As a variant, the source blocks are juxtaposed, or separated.

In addition, the relative position of the source blocks depends on the orientation of the sub-band under consideration. Thus source blocks in the sub-band $LH_2$ containing horizontal details are aligned, here overlap, horizontally. This is because it is preferable for the relative orientation of the source blocks in each sub-band to correspond to that of the patterns in the sub-band under consideration. The horizontal details are better predicted, and consequently coded if the source blocks are aligned horizontally. Similarly, source blocks in the sub-band $HH_2$ containing diagonal details overlap along a diagonal line. Finally, source blocks in the sub-band $HL_2$ containing vertical details overlap vertically.

The coding circuit 5 codes each block $A_{n,m}$ of the detail sub-bands. A target block $A_{n,m}$ is coded either by setting to a constant value, here zero, or according to source blocks in the sub-band of the same orientation and lower resolution, with respect to the sub-band of the target block under consideration. To this end, the coding circuit determines a transformation, here a multilinear approximation, between the source blocks and the target block. An indicator $I_{n,m}$ forms part of the coded form of each of the blocks, in order to indicate which coding mode was used to code each of the blocks.

The choice between the two coding modes is made according to a criterion which will be disclosed below. Likewise, the two coding modes will be detailed with reference to FIG. 8.

As a variant, the coding circuit performs only coding by transformation. The indicator is then not necessary.

The decoding circuit 6 decodes the block and supplies the decoded block $AR_{n,m}$ to the buffer memory 7. The decoding of a block is detailed below with reference to FIG. 9.

A decoded sub-band is then used for coding the blocks of the sub-band of the same orientation and higher resolution.

This is because the source blocks used by the circuit 5 are blocks issuing from frequency sub-bands successively coded and then decoded; in the decoding device described hereinafter, the source blocks will necessarily have this characteristic, since only decoded information will then be available. In order to avoid propagation of the coding approximations, the coding and decoding are performed using the same source blocks. The coding device also uses decoded information for coding the frequency sub-bands. The coding device must therefore extract the source blocks from a sub-band which has previously been coded and then decoded.

This is why the sub-bands are coded by increasing resolution. The sub-bands $LH_3$, $HL_3$, and $HH_3$ of resolution $RES_3$ are all first of all coded from sub-bands which are coded and then decoded $LH_4$, $HL_4$ and $HH_4$ respectively. Next the sub-bands $LH_2$, $HL_2$ and $HH_2$ of resolution $RES_2$ are coded using coded and then decoded sub-bands $LH_3$, $HL_3$ and $HH_3$ respectively, and so on.

The coding circuit 5 transmits each coded block to the processing circuit 8.

Figure 6:
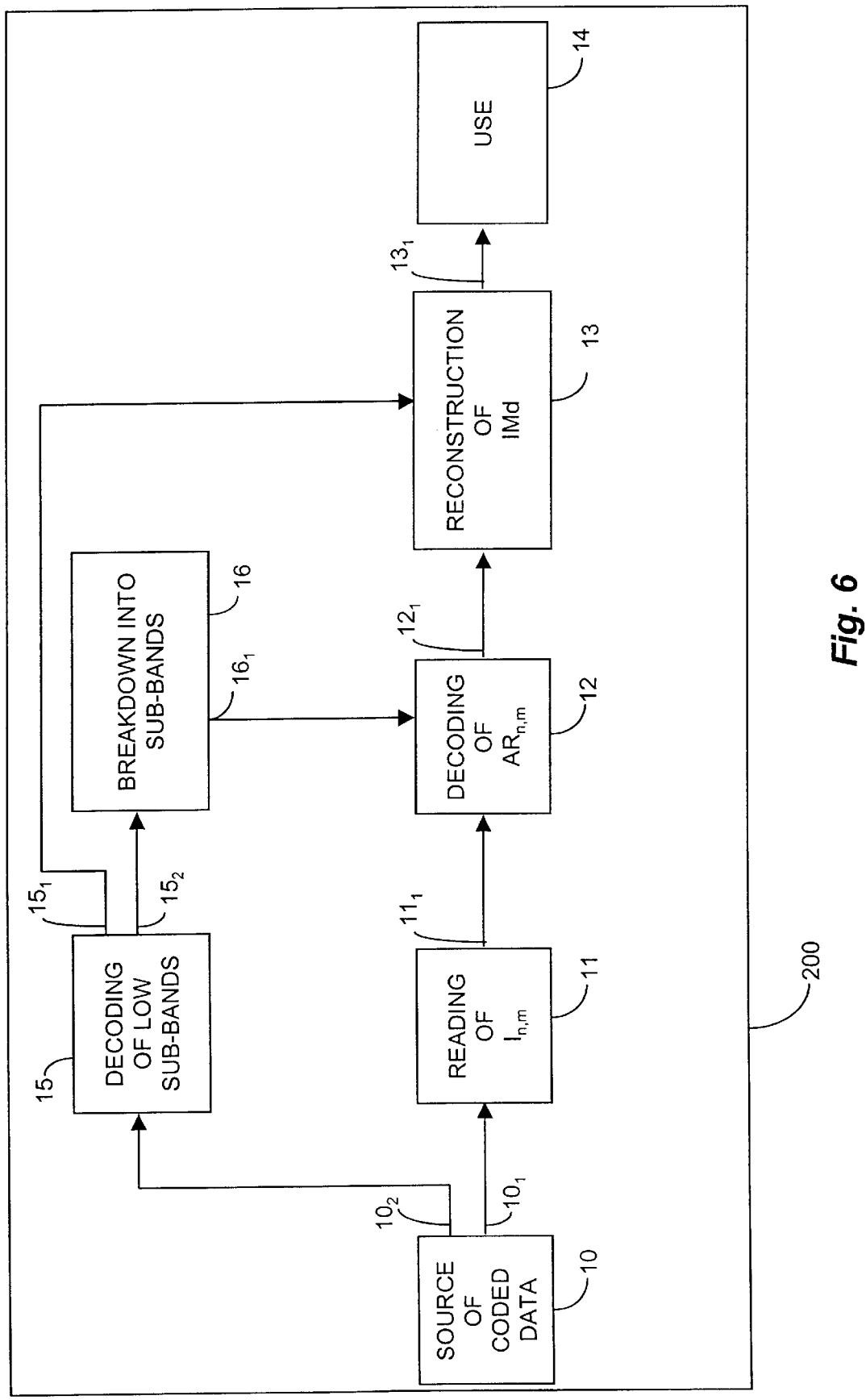
FIG. 6 is a block diagram of an embodiment of a decoding device according to the invention.

With reference to FIG. 6, the decoding device overall performs operations which are the reverse of those of the coding device. The decoding device is integrated into an apparatus 200, which is for example a digital image reader, or a digital video sequence reader, or a database management system, or a computer.

One and the same apparatus may include both the coding device and the decoding device according to the invention, so as to perform coding and decoding operations.

The decoding device includes a coded data source 10 which includes for example a receiving circuit associated with a buffer memory.

A first output $10_1$ of the circuit 10 is connected to a circuit 11 for reading compressed forms {k, m}, an output $11_1$ of which is connected to a decoding circuit 12.

The decoding circuit 12 has an output $12_1$ connected to a reconstruction circuit 13. The latter has an output $13_1$ connected to a circuit 14 for using decoded data, including for example image display means.

The circuit 10 has a second output $10_2$ connected to a circuit 15 for decoding the low sub-band, a first output $15_1$ of which is connected to the reconstruction circuit 13 and a second output $15_2$ of which is connected to a circuit for breaking down into sub-bands 16. The latter has an output $16_1$ connected to the decoding circuit 12.

The circuit 10 supplies the coded form $LLC_3$ of the low sub-band to the decoding circuit 15. The latter is identical to the circuit 31 and effects a decoding corresponding to the coding of the circuit 3 (FIG. 1). The decoding circuit 15 supplies the decoded low sub-band $LLd_3$ to the reconstruction circuit 13 and to the circuit for breaking down into sub-bands 16. The latter constructs the sub-bands $LL_4$, $LH_4$, $HL_4$ and $HH_4$. The sub-bands $LH_4$, $HL_4$ and $HH_4$ are intended to decode the detail sub-bands $LH_3$, $HL_3$ and $HH_3$ of resolution $RES_3$.

The circuit 10 supplies the coded forms of the blocks of the detail sub-bands to the circuit 11. The latter reads the indicator $I_{n,m}$ in order to determine which coding mode was used for coding each of the blocks, and reads the coding data which form part of the coded form of each of the blocks. Where only the coding by transformation mode is used, there is no reading of an indicator and the circuit 10 supplies the coded forms directly to the decoding circuit 12.

The coded form of each of the blocks is supplied to the decoding circuit 12, which decodes each of the blocks according to the coding mode used for coding the block under consideration. The decoding is disclosed with reference to FIG. 9.

The circuit 12 supplies the decoded block $AR_{n,m}$ to the reconstruction circuit 13, which is a synthesis circuit corresponding to the analysis circuit 2 described previously, and reconstructs the image IMd corresponding to the decoded sub-bands.

According to a preferred embodiment of the invention, the circuits for breaking down into sub-bands 2, for coding 3, for decoding 31, for breaking down into sub-bands 32, for dividing into blocks 4, for coding 5 and for decoding 6, the buffer memory circuit 7 and processing circuit 8, all included in the coded device depicted in FIG. 1, are implemented by a microprocessor associated with random access and read only memories. The read only memory contains a program for coding each of the blocks of data, and the random access memory contains registers adapted to record variables modified during the running of the program.

Likewise, the circuits for reading 11, decoding 12, reconstruction 13, decoding 15, and breaking down into sub-bands 16, all included in the decoding device depicted in FIG. 6, are implemented by a second microprocessor associated with random access and read only memories. The read only memory contains a program for decoding each of the blocks of data, and the random access memory contains registers adapted to record variables modified during the running of the program.

Figure 7:
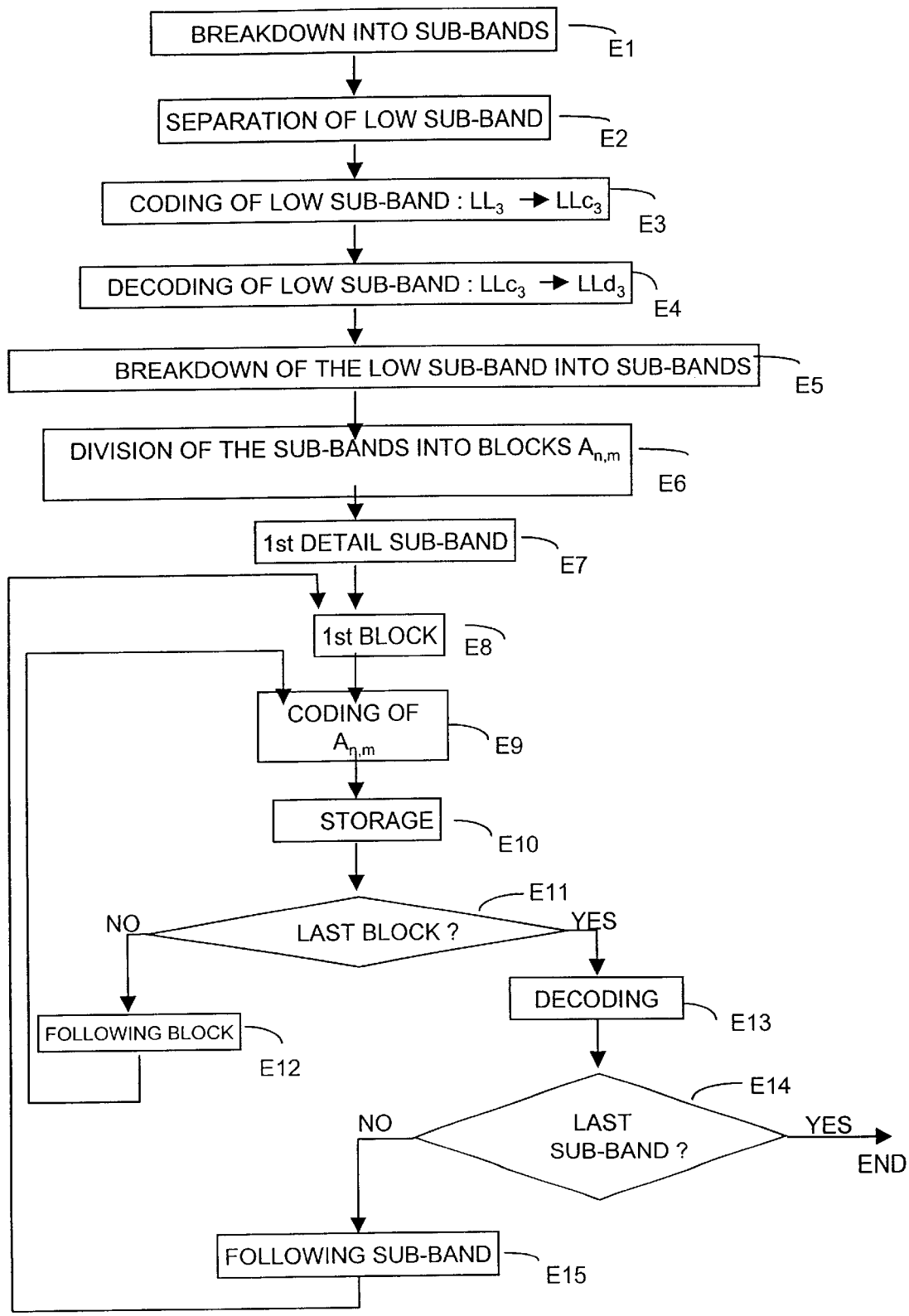
FIG. 7 is an algorithm for coding a digital signal according to the invention.

With reference to FIG. 7, a method according to the invention for coding an image IM, implemented in the coding device, includes steps E1 to E15. The method includes overall the breakdown of the image into sub-bands of different resolutions, and then the coding of the low sub-band separately. Each of the detail sub-bands is next coded as a function of the sub-band of the same orientation and lower resolution.

Step E1 is the breakdown of the image IM into sub-bands, as depicted in FIG. 4. Step E1 results in the sub-bands $LL_3$, $HL_3$, $LH_3$ and $HH_3$ flowest resolution $RES_3$, the sub-bands $LH_2$, $HL_2$, $HH_2$ of intermediate resolution $RES_2$, and the sub-bands $LH_1$, $HL_1$ and $HH_1$ of highest resolution $RES_1$.

The low sub-band $LL_3$ is separated from the other sub-bands at the following step E2.

The step E3 codes the low sub-band $LL_3$, for example according to a DPCM (Differential Pulse Code Modulation) coding, and results in the coded sub-band $LLc_3$, which is stored and/or transmitted.

Step E3 is followed by step E4, which is the decoding of the sub-band $LLc_3$. A decoded sub-band $LLd_3$ is formed. The decoding mode depends on the coding mode used at the preceding step.

At the following step E5, the decoded sub-band $LLd_3$ is broken down into sub-bands of lower resolution $LL_4$, $HL_4$, $LH_4$ and $HH_4$. The sub-bands $HL_4$, $LH_4$ and $HH_4$ are used for coding the sub-bands $HL_3$, $LH_3$ and $HH_3$ of resolution $RES_3$.

The step E5 is followed by step E6, which is the division of the sub-bands into blocks $A_{n,m}$, as depicted in FIG. 5.

The following step E7 is an initialisation for considering the first detail sub-band to be coded. The resolution levels are processed in increasing order. For each resolution level, the sub-bands are taken into account in an order which is a priori random, whilst being predetermined.

The following step E8 is an initialisation for considering the first block of the current sub-band. The blocks in the current sub-band are taken into account in a random and predetermined order.

The step E8 is followed by step E9, which is the coding of the current block $A_{n,m}$. The step E9 is detailed below; it results in a coded form of the current block.

The following step E10 is the storage of the value of the coded form of the current block.

Steps E11 and E14 are tests for verifying, respectively, whether all the blocks of a sub-band have been coded, and whether all the sub-bands have been coded. If there remains at least one block to be coded in the current sub-band, step E11 is followed by step E12 in order to consider the following block. Step E12 is followed by the previously described step E9.

When all the blocks of a sub-band have been coded, step E11 is followed by step E13, at which the blocks are decoded in order to form a decoded sub-band. The decoding of each of the blocks is described below with reference to FIG. 9.

If there remains at least one sub-band to coded, step E14 is followed by step E15 for considering the following sub-band. Step E15 is followed by the previously described step E8.

Figure 8:
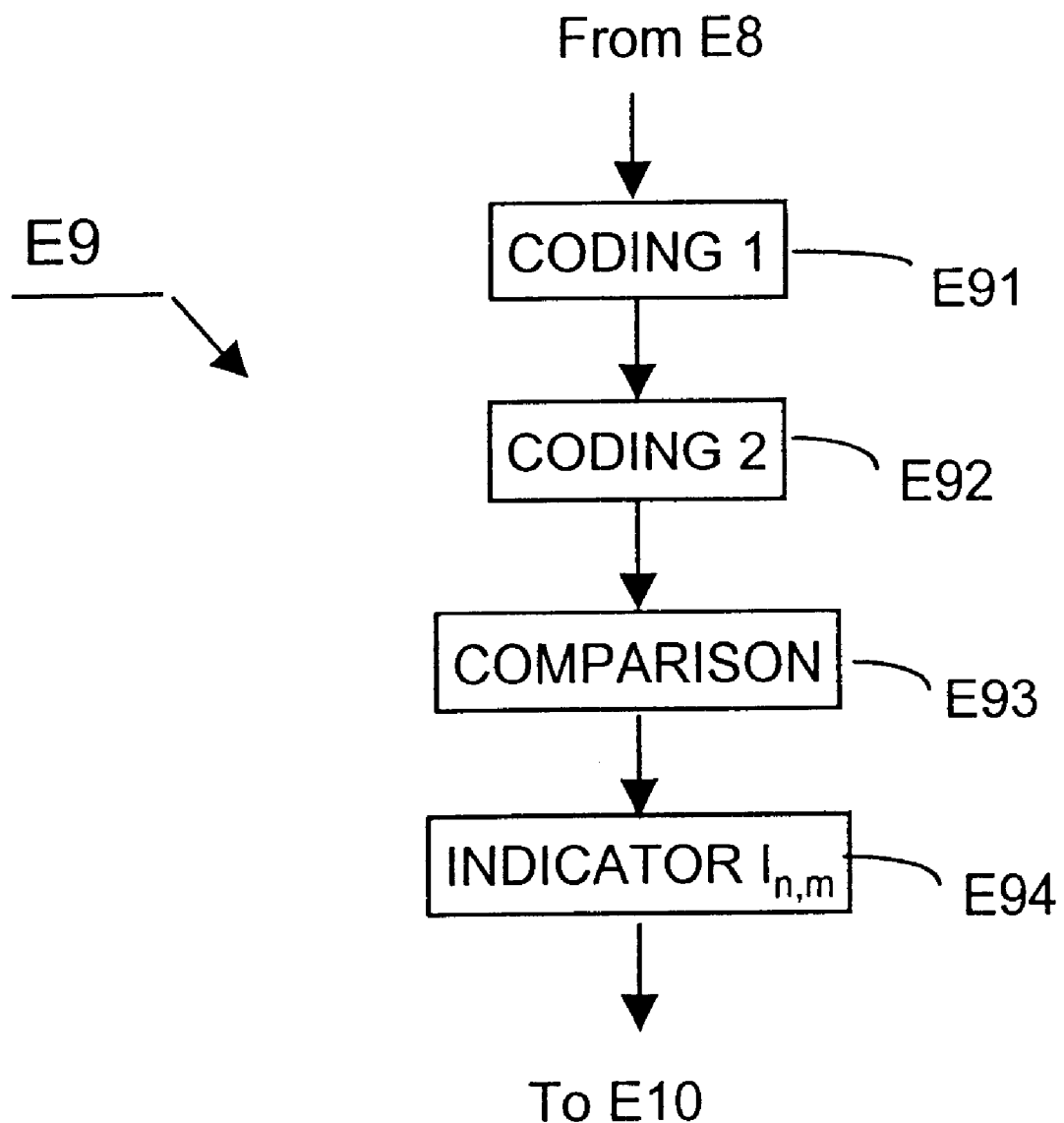
FIG. 8 is an algorithm for coding a block, included in the algorithm of FIG. 7.

The step E9 of coding a block of a detail sub-band, referred to as a target block, is detailed in FIG. 8 and includes sub-steps E91 to E94.

Step E91 is the coding, by setting to a predetermined value, here zero, of the coefficients of the current block $A_{n,m}$.

The following step E92 is the coding by a second coding mode of the current block $A_{n,m}$. The second coding mode consists of selecting source blocks in the sub-band of the same orientation and lower resolution with respect to the sub-band containing the block currently being processed and then determining a transformation between the source blocks and the block to be coded.

According to a preferred embodiment, the transformation is a multilinear approximation, of the form: $T_{n,m} = \{a_{n,m,k}\}$ enabling the block $AR_{n,m} = \Sigma_k (a_{n,m,k} \times D_{n,m,k})$ to be constructed.

In this expression, $a_{n,m,k}$ is a scale function, here a constant function, or coefficient, for a given source block $D_{n,m,k}$ and with a norm less than unity. The function $a_{n,m,k}$ applies to each of the coefficients of the block $D_{n,m,k}$, which amounts here to multiplying all the pixels by the coefficient $a_{n,m,k}$.

The functions, here the coefficients, $a_{n,m,k}$ are determined so as to minimise a distance $d(A_{n,m}, AR_{n,m})$ between the block to be coded $A_{n,m}$ and the reconstructed block $AR_{n,m}$ by applying the transformation $T_{n,m}$ to the source blocks in accordance with the formula given above.

According to an embodiment which is simple to implement, the functions $a_{n,m,k}$ are made discrete and a limited number of possible values for the coefficient $a_{n,m,k}$ are tested. The best combination is chosen in the sense of the distance described below.

According to another embodiment, the coefficients $a_{n,m,k}$ are determined conventionally as being the real numbers which are a solution of the equation minimising the norm of the difference between the vectors $A_{n,m}$ and $AR_{n,m}$. These real coefficients must be quantized and then coded, for example by entropic coding.

The distance is calculated between the grey levels of the block to be coded $A_{n,m}$ and the coefficients of the block $AR_{n,m}$ resulting from the application of the approximation to the source blocks $D_{n,m,1}$ to $D_{n,m,K}$.

The distance can be the absolute value of the sum of the differences, or the root mean square error, or the absolute value of the greatest difference, calculated between the source block $A_{n,m}$ and the block reconstructed by applying the transformation $T_{n,m}$ to the source blocks.

In a preferred embodiment, the distance is the root mean square error calculated between the grey levels of the block to be coded $A_{n,m}$ and the coefficients of the block $AR_{n,m}$ resulting from the application of the transformation to the source blocks $D_{n,m1}$ to $D_{n,m,K}$.

According to other embodiments:
the transformation combines a multilinear approximation calculated on the source blocks and geometric transformations, such as rotation, of the source blocks,
the transformation is of polynomial form, for example of second or third order, calculated on the values of the pixels of the source blocks. This type of transformation gives more precise results, whilst taking longer to calculate.

The following step E93 is the comparison of the two coding modes, for the current block, according to a predetermined criterion. Step E93 results in the selection of one of the coding modes, for the current block $A_{n,m}$.

For example, the criterion consists of calculating the sums $R_{1,n,m}+\lambda.D_{1,n,m}$ and $R_{2,n,m}+\lambda.D_{2,n,m}$, where $R_{1,n,m}$ and $R_{2,n,m}$ are the rates necessary for transmitting the current block coded by the two modes, $D_{1,n,m}$ and $D_{2,n,m}$ are the distortions caused in the current block by the two coding modes, and $\lambda$ is a coefficient for adjusting the compression/distortion ratio. The errors $D_{1,n,m}$ and $D_{2,n,m}$ measure respectively the squared error given to the reconstructed image by the coding of the block under consideration, according to the first and second coding modes. The coding for which the sum is the lowest is selected, for the current block.

The following step E94 is the updating of an indicator $I_{n,m}$ whose value depends on the coding mode selected at step E93. The indicator $I_{n,m}$ forms part of the coded form of the block under consideration $A_{n,m}$. If the block under consideration is coded by setting to zero, no other coding information is necessary. If the block is coded by means of a transformation, the transformation $T_{n,m}$ forms part of the coded form of the block.

Step E94 is followed by the step E10 of storing the coded form.

Figure 9:
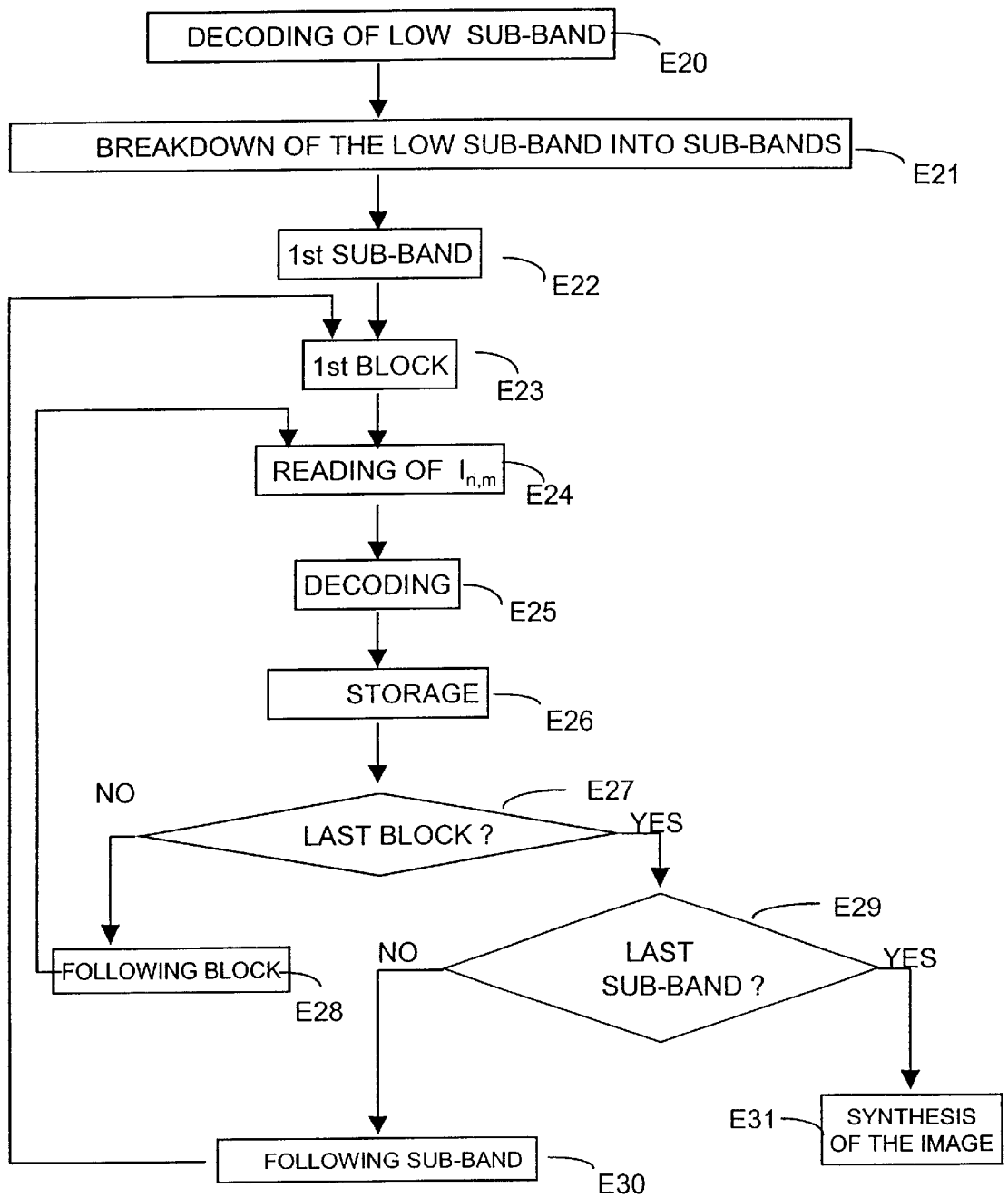
FIG. 9 is an algorithm for decoding a digital signal according to the invention.

With reference to FIG. 9, a method of decoding an image IM according to the invention, implemented in the decoding device, comprises steps E20 to E31.

Step E20 is the decoding of the low sub-band $LLc_3$ in order to form a decoded low sub-band $LLd_3$, which is stored to memory.

The following step E21 is the breakdown of the decoded low sub-band $LLd_3$ into sub-bands of lower resolution $LL_4$, $HL_4$, $LH_4$ and $HH_4$. The sub-bands $HL_4$, $LH_4$ and $HH_4$ are used for decoding the sub-bands $HL_3$, $LH_3$ and $HH_3$ of higher resolution $RES_3$.

The following step E22 is an initialisation for considering the first detail sub-band to be decoded. The first sub-band is of resolution $RES_3$.

Step E22 is followed by step E23, which is an initialisation for considering the first block to be decoded in the current sub-band. The sub-bands are decoded in the same order as at coding, and the blocks in a given sub-band are decoded in the same order as at coding, although different orders are possible.

The following step E24 is the reading of the indicator $I_{n,m}$ in order to determine which coding mode was used to code the current block.

Step E24 is followed by step E25, which is the decoding of the current block. If the block was coded by setting to zero, the decoding consists of creating a block, all the coefficients of which are at the value zero. If the block was coded by a transformation, the decoding consists of applying the transformation $T_{n,m}$, defined by the parameters $a_{n,m,k}$, to the source blocks $D_{n,m,1}$ to $D_{n,m,K}$, according to the formula:

$$AR_{n,m} = \Sigma_k (a_{n,m,k} \times D_{n,m,k}).$$

Step E25 results in the decoded block $AR_{n,m}$.

The decoded block $AR_{n,m}$ is stored at the following step E26.

Steps E27 and E29 are test for verifying respectively whether all the blocks of a sub-band have been decoded and whether all the sub-bands have been decoded. If there remains at least one block to be decoded in the current sub-band, step E27 is followed by step E28 in order to consider the following block. Step E28 is followed by the previously described step E24.

If there remains at least one sub-band to be decoded, step E29 is followed by step E30 in order to consider the following sub-band. Step E30 is followed by the previously described E23.

When all the sub-bands have been decoded, that is to say when the response is positive at step E29, the latter step is followed by the step E31 of synthesising the decoded image. The latter can then be displayed for example.

Naturally, the present invention is in no way limited to the embodiments described and depicted, but quite the contrary encompasses any variant within the capability of a person skilled in the art.

In particular, the invention can easily be applied to other types of signal.

These signals can be monodimensional signals such as sounds, or seismic readings, or electrocardiograms; according to their nature, the analysis of the signals is performed according to time or spatial frequencies.

These signals can be three-dimensional such as video sequences represented according to two spatial frequencies and one time frequency. A breakdown into frequency sub-bands in three dimensions is then implemented, and the breakdown of the signal into blocks also takes place in three dimensions, which leads to the formation of groups of coefficients included in cylinders, in the more general sense of the term, for example the coefficients of the digital image sequence included in the volume of a cube.

For a signal having components in several frequency bands, such as a colour image signal having red, green and blue components, the invention applies to each of the components, which are then coded independently of each other.

What is claimed is:

1. Digital signal coding method including a step of analysing a digital signal into a plurality of frequency sub-bands distributed in at least two different resolutions, at least one first sub-band having a lower resolution and at least one second sub-band having a higher resolution, which includes, for each second sub-band, the steps of:
dividing the second sub-band into target blocks,
selecting, for each of the target blocks, a predetermined number of source blocks in the at least one first sub-band, said source blocks overlapping in pairs, and
determining, for each of the target blocks, a multilinear approximation between the source blocks selected at the preceding step and the target block.

2. Coding method according to claim 1, wherein, for any target block under consideration, the location of the source blocks selected in the first sub-band is determined according to the location of the target block in the second sub-band.

3. Coding method according to claim 1, wherein the sub-bands formed at the analysis step contain details in different orientations with respect to the original digital signal, and wherein, for any target block under consideration, the relative position of the source blocks selected in the first sub-band depends on the orientation of the sub-band under consideration.

4. Coding method according to claim 1, wherein the sub-bands formed at the analysis step contain details in different orientations with respect to the original digital signal, and wherein, for any second sub-band under consideration, the first sub-band is the sub-band of the same orientation and immediately lower resolution with respect to the second sub-band.

5. Coding method according to claim 1, wherein, for any one of the target blocks under consideration, the multilinear approximation minimizes a distance between the target block and its approximation calculated by applying the multilinear approximation to the selected source blocks.

6. Coding method according to claim 5, wherein, for any one of the target blocks under consideration, the calculation of the distance includes the calculation of a difference between the values of the data of the target block and the values of its approximation calculated by applying the multilinear approximation to the source blocks.

7. Coding method according to claim 5, wherein the distance is the root mean square error calculated between the values of the target block and the values of the block resulting from the application of the approximation to the source blocks.

8. Coding method according to claim 1, wherein, for any one of the target blocks under consideration, the source blocks have a size which is a multiple by a factor $F^2$ of that of the target block and are sub-sampled by the factor F, where F is an integer greater than or equal to two.

9. Coding method according to claim 1, wherein, for any one of the target blocks under consideration, the source blocks have the same size as the target block.

10. Digital signal processing apparatus, having means adapted to implement the coding method according to claim 1.

11. Digital signal coding method including a step of analysing a digital signal into a plurality of frequency sub-bands distributed according to at least two different resolutions, at least one first sub-band having a lower resolution and at least one second sub-band having a higher resolution, which includes, for each second sub-band, the steps of:
dividing the second sub-band into target blocks,
selecting target blocks which are to be coded by setting to a predetermined value, according to a selection criterion,
coding the target blocks selected at the preceding step, by setting to the predetermined value,
selecting, for each of the target blocks which have not been selected, a predetermined number of source blocks in the at least one first sub-band, said source blocks overlapping in pairs, and
determining, for each of the target blocks which have not been selected, a multilinear approximation between the source blocks selected at the preceding step and the target block.

12. Coding method according to claim 11, wherein, for each of the target blocks, the selection step includes the coding of the target block by setting to the predetermined value and by determining a multilinear approximation between source blocks and the target block, the comparison of the two coding modes according to the selection criterion and the selection of coding by setting to the predetermined value if the block coded by setting to the predetermined value satisfies the selection criterion.

13. Coding method according to claim 11, wherein the selection criterion minimises a weighted sum of the transmission rate and coding error caused by the coding of the target block under consideration.

14. Coding method according to claim 11, wherein an indicator is associated with each target block for indicating whether or not the block under consideration is coded by setting to the predetermined value.

15. Method of decoding a coded digital signal, said signal including coded representations of blocks formed in at least one second sub-band of a plurality of frequency sub-bands of the original signal, said sub-bands being distributed according to at least two different resolutions, at least one first sub-band having a lower resolution and at least one second sub-band having a higher resolution, each coded representation including at least one multilinear approximation between the block and selected source blocks in said at least one first sub-band, said source blocks overlapping in pairs, which includes, for each block of each second sub-band, the step of applying the multilinear approximation to the source blocks in order to decode the block.

16. Digital signal processing apparatus, having means adapted to implement the decoding method according to claim 15.

17. Method of decoding a coded digital signal, said signal including coded representations of blocks formed in at least one second sub-band of a plurality of frequency sub-bands of the original signal, said sub-bands being distributed according to at least two different resolutions, at least one first sub-band having a lower resolution and at least one second sub-band having a higher resolution, each coded representation including at least one indicator for indicating whether the block has been coded by setting to a predetermined value or by a multilinear approximation between the block and selected source blocks in said at least one first sub-band, said source blocks overlapping in pairs, which includes, for each block of each second sub-band, the steps of:
- reading the indicator,
- forming a block, all the coefficients of which are at the predetermined value if the block was coded by setting to the predetermined value,
- applying the transformation to the source blocks in order to decode the block, if the block was coded by a multilinear approximation between the block and source blocks.

18. Digital signal coding device including means of analysing digital signal into a plurality of frequency sub-bands distributed in at least two different resolutions, at least one first sub-band having a lower resolution and at least one second sub-band having a higher resolution, which includes, for each second sub-band:
- means of dividing the second sub-band into target blocks;
- means of selecting, for each of the target blocks, a predetermined number of source blocks in the at least one first sub-band, said source blocks overlapping in pairs; and
- means of determining, for each of the target blocks, a multilinear approximation between the source blocks selected at the preceding step and the target block.

19. Coding device according to claim 18, for any target block under consideration, to determine the location of the source blocks selected in the first sub-band according to the location of the target block in the second sub-band.

20. Coding device according to claim 18, characterised in that it is adapted to form the sub-bands so that they contain details in different orientations with respect to the original digital signal, and in that it is adapted, for any target block under consideration, to select the source blocks ($D_{n,m,k}$) in the first sub-band so that their relative position depends on the orientation of the sub-band under consideration.

21. Coding device according to claim 18, characterised in that it is adapted to form the sub-bands so that they contain details in different orientations with respect to the original digital signal, and in that it is adapted, for any second sub-band under consideration, to consider, as the first sub-band, the sub-band of the same orientation and of immediately lower resolution with respect to the second sub-band.

22. Coding device according to claim 18, adapted to implement, for any one of the target blocks under consideration, a transformation which minimizes a distance between the target block and its approximation calculated by applying the multilinear approximation to the selected source blocks.

23. Coding device according to claim 22, adapted, in order to calculate the distance for any one of the target blocks under consideration, to calculate a difference between the values of the data of a target block and the values of its approximation calculated by applying the multilinear approximation to the source blocks.

24. Coding device according to claim 22, adapted to calculate a distance which is the root mean square error calculated between the values of the target block and the values of the block resulting from the application of the approximation to the source blocks.

25. Coding device according to claim 18, adapted to form, for any one of the target blocks under consideration, source blocks which have a size which is a multiple by a factor $F^2$ of that of the target block and to sub-sample them by the factor F, where F is an integer greater than or equal to two.

26. Coding device according to claim 18, adapted to form, for any one of the target blocks under consideration, source blocks which have the same size as the target block.

27. Coding device according to claim 18, wherein the division, selection and determination means are incorporated in:
- a microprocessor;
- a read only memory containing a program for coding each of the blocks of data; and
- a random access memory containing registers adapted to record variables modified during the running of the said program.

28. Digital signal processing apparatus, including the coding device according to claim 18.

29. Digital signal coding device including means of analysing the digital signal into a plurality of frequency sub-bands distributed according to at least two different resolutions, at least one first sub-band having a lower resolution and at least one second sub-band having a higher resolution, which includes, for each second sub-band:
- means of dividing the second sub-band into target blocks;
- means of selecting target blocks which are to be coded by setting to a predetermined value, according to a selection criterion;
- means of coding the target blocks selected at the preceding step, by setting to the predetermined value;
- means of selecting, for each of the target blocks which have not been selected, a predetermined number of source blocks in the at least one first sub-band, said source blocks overlapping in pairs; and
- means of determining, for each of the target blocks which have not been selected, a multilinear approximation between the source blocks selected at the preceding step and the target block.

30. Coding device according to claim 29, adapted, for each of the target blocks, to code the target block by setting to the predetermined value and by determining a multilinear approximation between source blocks and the target block, to compare the two coding modes according to the selection criterion and to select coding by setting to the predetermined value if the block coded by setting to the predetermined value satisfies the selection criterion.

31. Coding device according to claim 29, adapted to use a selection criterion which minimizes a weighted sum of the transmission rate and coding error caused by the coding of the target block under consideration.

32. Coding device according to claim 29, adapted to associate an indicator with each target block in order to indicate whether or not the block under consideration is coded by setting to the predetermined value.

33. Device for decoding a coded digital signal, said signal including coded representations of blocks formed in at least one second sub-band of a plurality of frequency sub-bands of the original signal, said sub-bands being distributed according to at least two different resolutions, at least one first sub-band having a lower resolution and at least one second sub-band having a higher resolution, each coded representation including at least one multilinear approximation between the block and selected source blocks in said at least one first sub-band, said source blocks overlapping in pairs, which includes, for each block of each second sub-band, means of applying the multilinear approximation to the source blocks in order to decode the block.

34. Decoding device according to claim 33, wherein the application means are incorporated in:

a microprocessor;

a read only memory containing a program for coding each of the blocks of data; and a random access memory containing registers adapted to record variables modified during the running of said program.

35. Digital signal processing apparatus, including the decoding device according to claim 34.

36. Device for decoding a coded digital signal, said signal including coded representations of blocks formed in at least one second sub-band of a plurality of frequency sub-bands of the original signal, said sub-bands being distributed according to at least two different resolutions, at least one first sub-band having a lower resolution and at least one second sub-band having a higher resolution, each coded representation including at least one Indicator for indicating whether the block has been coded by setting to a predetermined value or by a multilinear approximation between the block and selected source blocks in the said at least one first sub-band, said source block overlapping in pairs, which includes, for each block of each second sub-band:

means of reading the indicator;

means of forming a block, all the coefficients of which are at the predetermined value if the block has been coded by setting to the predetermined value; and means of applying the multilinear approximation to the source blocks in order to decode the block, if the block has been coded by a multilinear approximation between the block and source blocks.

* * * * *

UNITED STATES PATENT AND TRADEMARK OFFICE
CERTIFICATE OF CORRECTION

PATENT NO.     : 6,580,757 B1
DATED          : June 17, 2003
INVENTOR(S)    : Isabelle Amonou It is certified that error appears in the above-identified patent and that said Letters Patent is hereby corrected as shown below:

<u>Column 10,</u>
Line 48, "to" should read -- to be --.

<u>Column 15,</u>
Line 29, "characterised in" should be deleted;
Lines 30 and 37, "that it is" should be deleted, and
"so that they contain" should read -- containing --;
Line 32, "in that it is' should be deleted;
Line 33, "($D_{n,m,k}$)" should be deleted;
Line 36, " characterised in" should be deleted;
Line 39, "and in that it is adapted," should read -- and, --.

Signed and Sealed this

Second Day of March, 2004

JON W. DUDAS
*Acting Director of the United States Patent and Trademark Office*